(12) United States Patent
Babbage et al.

(10) Patent No.: US 9,247,429 B2
(45) Date of Patent: Jan. 26, 2016

(54) KEY DERIVATION

(75) Inventors: Stephen Babbage, Newbury (GB);
Nicholas Bone, Newbury (GB)

(73) Assignee: Vodafone IP Licensing Limited,
Newbury, Berkshire (GB)

( * ) Notice: Subject to any disclaimer, the term of this patent is extended or adjusted under 35 U.S.C. 154(b) by 75 days.

(21) Appl. No.: 13/994,389

(22) PCT Filed: Dec. 15, 2011

(86) PCT No.: PCT/GB2011/052490
§ 371 (c)(1),
(2), (4) Date: Dec. 10, 2013

(87) PCT Pub. No.: WO2012/080740
PCT Pub. Date: Jun. 21, 2012

(65) Prior Publication Data
US 2014/0087691 A1    Mar. 27, 2014

(30) Foreign Application Priority Data

Dec. 15, 2010   (GB) .................................. 1021300.7

(51) Int. Cl.
*H04W 12/06* (2009.01)
*H04L 9/08* (2006.01)
*H04L 9/14* (2006.01)
(Continued)

(52) U.S. Cl.
CPC .............. *H04W 12/06* (2013.01); *H04L 9/0869* (2013.01); *H04L 9/0897* (2013.01); *H04L 9/14* (2013.01); *H04L 9/3234* (2013.01); *H04L 9/3236* (2013.01); *H04L 9/3271* (2013.01); *H04W 12/04* (2013.01); *H04L 2209/80* (2013.01); *H04L 2463/061* (2013.01)

(58) Field of Classification Search
CPC .... H04B 1/3816; H04W 12/06; H04W 12/04; H04L 2209/80; H04L 2463/061; H04L 9/0869; H04L 9/0897; H04L 9/14; H04L 9/3234; H04L 9/3236; H04L 9/3271
USPC .......................... 455/411, 558; 713/165, 169
See application file for complete search history.

(56) References Cited

U.S. PATENT DOCUMENTS

| 6,934,531 B1 | 8/2005 | Hake et al. |
| 2004/0153659 A1 | 8/2004 | Naccache et al. |
| 2006/0128305 A1* | 6/2006 | Delalat ........................ 455/41.2 |

(Continued)

FOREIGN PATENT DOCUMENTS

| DE | 198 40 742 | 3/2000 |
| EP | 1209934 A3 | 5/2002 |

(Continued)

OTHER PUBLICATIONS

GB Search Report for GB1021300.7 dated Apr. 11, 2011.
(Continued)

*Primary Examiner* — Inder Mehra
(74) *Attorney, Agent, or Firm* — Workman Nydegger

(57) ABSTRACT

To facilitate a change in network authentication key (Ki) for use by a smart card (SIM) during authentication on a cellular telecommunications network, there is provided a smart card management scheme that combines key derivation with over the air (OTA) provisioning. This scheme ensures both that the Ki is never transmitted OTA and that the Ki is stored in two locations only: on the SIM and at an authentication center (AuC).

20 Claims, 2 Drawing Sheets

(51) Int. Cl.
*H04L 9/32* (2006.01)
*H04W 12/04* (2009.01)

(56) References Cited

U.S. PATENT DOCUMENTS

| | | | |
|---|---|---|---|
| 2007/0271603 A1* | 11/2007 | Lee et al. | 726/9 |
| 2008/0276090 A1 | 11/2008 | Merrien et al. | |
| 2010/0030695 A1* | 2/2010 | Chen et al. | 705/67 |
| 2010/0048174 A1* | 2/2010 | Osborn | 455/411 |
| 2010/0273452 A1* | 10/2010 | Rajann | H04W 8/22 455/411 |
| 2010/0322418 A1* | 12/2010 | Potkonjak | 380/255 |
| 2011/0010543 A1* | 1/2011 | Schmidt et al. | 713/168 |
| 2012/0030744 A1* | 2/2012 | Faure et al. | 726/9 |
| 2012/0144189 A1* | 6/2012 | Zhong | 713/155 |

FOREIGN PATENT DOCUMENTS

| | | | | |
|---|---|---|---|---|
| EP | 2182750 A1 | 5/2010 | | |
| EP | 2200253 A1 | 6/2010 | | |
| FR | EP 2200253 | * | 6/2010 | H04L 29/06 |
| GB | 2378098 A | 1/2003 | | |
| GB | 2464830 A | 5/2010 | | |
| WO | WO 03/013174 | 2/2003 | | |
| WO | WO 2009/102247 | 8/2009 | | |

OTHER PUBLICATIONS

International Search Report for PCT/GB2011/052490 dated Mar. 23, 2012.

* cited by examiner

KEY DERIVATION

CROSS-REFERENCE TO RELATED APPLICATIONS

This application is a U.S. Nationalization of PCT Application No. PCT/GB2011/052490, filed on Dec. 15, 2011, which claims priority to United Kingdom Patent Application No. 1021300.7, filed on Dec. 15, 2010, the entireties of which are incorporated herein by reference.

FIELD OF THE INVENTION

The invention relates to the field of smartcards for authenticating terminal equipment with the wireless telecommunications networks, such as GSM or UMTS networks, or mobile network operators (MNOs).

BACKGROUND TO THE INVENTION

SIM cards (also referred to as Universal Integrated Circuit Cards, UICCs) are a ubiquitous form of smart card. Wireless telecommunications network standards mandate that authentication of networked devices is facilitated though SIM cards (in fact the term SIM card is often used collectively to encompass true SIM cards and USIM cards). These cards securely store essential components of the network authentication procedure: secret keys (including the network authentication key (Ki)), "over the air" (OTA) transport keys and parameters for one or more operator encryption algorithms.

Each SIM card is specific to the customer and, in addition to authentication information, carries information particular to that customer such as the customer's International Mobile Subscriber Identifier (IMSI).

SIM cards are used to provide the relevant identification (e.g. IMSI) and authentication information for each terminal. In certain applications, for instance telematics applications, the SIM may not be provided on a card per se but on an integrated circuit implanted or integrated into the device. This may, for example, take the form of a VQFN8 package for standardised installation.

Existing SIM cards are typically personalized for a single MNO: in other words, they store secret keys that are only valid on the network of one MNO. Each SIM will thus be specific to a particular network (the "home" network) —that is, it will have been issued under the control of the operator of that network and will be for use within that network.

Changing MNO requires the physical exchange of removable SIM cards. This exchange of card is impracticable some cases—the terminals where SIMs need to be swapped may be widely distributed or embedded (and consequently unswappable).

It is an essential security requirement of cellular telecommunications systems that the network authentication key (Ki) of the SIM is only ever stored at two points of the network, i.e. on the SIM and at the authentication centre (AuC). Additionally, the Ki is never transmitted in any sense, whatsoever. In fact, the removal or transmission of the Ki from the SIM at any point after manufacture is illegal in some territories.

In a conventional telecommunications system, the Ki is paired with the International Mobile Subscriber Identity (IMSI) of the SIM at the point of manufacture. Only the IMSI and hence its intrinsically coupled Ki, dictates which network a device can connect to natively. It is not presently feasible for a SIM to connect natively to, or inherit the footprint of, a variety of networks because the Ki, as mentioned above, is not transmittable, transferable or programmable.

The conventional SIM and network arrangement is less than satisfactory. If a terminal with its associated SIM card is in use within a product and functioning within a particular operating company's network, problems will arise if the terminal's owner wishes to avail himself of the services of a rival network operator (perhaps because the terminals is to be moved permanently into a geographical region not covered by the original network with which it is registered).

Switching the SIM has associated logistical difficulties, and, additionally, could have the result that useful information placed on the previous SIM card would be lost. Moreover, in certain applications, where the SIM is not stored in the form of a removable smart card but on an integrated circuit implanted into a device, a SIM replacement would not be possible.

Previous attempts to design a SIM capable of registering and re-registering on multiple networks have been based on the principle of producing multiple instances of a single SIM within one 'super SIM' which is then able to pick an IMSI-Ki pair to be used in each situation, i.e. when registering and re-registering on multiple networks. An example of this is described in International Patent publication WO 03/013174 where such a smart card is described. As a general solution to the problem of switching operator without switching the SIM card itself, this has a number of inherent disadvantages.

Firstly, as the SIM is effectively multiple SIMs placed within the same physical SIM card/UICC, there is an inherent ambiguity as to who would be the owner of the 'super SIM'. Each IMSI-Ki pair would be considered the property of a network in each territory or the organisation responsible for the issuance of each IMSI-Ki pair.

Secondly, using this mechanism entails a change in operator logistics so that an operator only learns its "Ki" after the assignment to that operator is complete, rather than being able to pre-order (Ki, IMSI, ICCID)s and pre-load to a home location register, HLR. Alternatively, it might be possible for each MNO to receive, in advance, one of the pre-loaded (IMSI, Ki, ICCID) values, but then there must be just as many Kis on each "super SIM" as there are MNOs in the entire system (hundreds globally), and the vast majority of these keys will never be used. Still, MNOs would incur costs for keeping all the unused keys in their HLRs.

An alternative solution is presented in US20080276090: here a global, intermediate key Kint is used with a key derivation algorithm on the card. A pseudo-random generator in a personalisation module generates a respective random number RND for each final identity number IMSI sent. Then, the personalisation module determines a final authentication key Ki, not yet assigned to any card, for each IMSI number sent. The authentication key Ki is determined by an algorithm AD, which has been loaded in the card, according to the generated intermediate authentication key Kint and the generated random number RND associated with the IMSI number. Thereafter the card uses the final authentication key Ki. In ensuring that the same Ki is derived on each possible card, the same Kint value needs to be loaded to multiple cards, Alternative mechanisms to send a "Ki" Over-The-Air involve a risk of the Ki being discovered in transit; they also incur a risk where a Ki is sent to a writable file on the card, which can then allow further writes (including partial overwrites). Such writes, especially partial overwrites, could compromise the secrecy of the Ki and/or associated parameters. A further danger is "lock in" whereby an MNO is forced to use the original vendor of the card (or a party chosen by that vendor) to send its Ki Over-The-Air. Alternatively, an MNO may be forced to use a keyset or algorithm that it does not design and does not entirely trust.

SUMMARY OF THE INVENTION

In accordance with the invention there is provided a method for managing subscription information stored on a microprocessor card, the card being pre-provisioned with an associated unique card number, at least one predefined master key (K_master) and at least one number generating means, the method comprising: receiving a derivation value (SEED) from one of a plurality of trusted parties (TSM); storing the derivation value (SEED) on the microprocessor card; generating an identification number (Ki) using the number generating means, the card number and the root key; wherein the identification number (Ki) generated is suitable for use in a telecommunications network.

In accordance with a further aspect of the invention there is provided a telecommunications security module, provisioned with one or more unique master keys, and one or more number generating algorithms, the module comprising: means for receiving a derivation value (SEED) from one of a plurality of trusted parties (TSM); storage means for storing the derivation value (SEED); a microprocessor for generating an identification number (Ki) using the number generating means, the card number and the root key; wherein the identification number (Ki) generated is suitable for use in a telecommunications network.

The invention also relates to a device that comprises or incorporates a telecommunications security module, provisioned with one or more unique master keys, and one or more key derivation algorithms, being able to derive at least one authentication key for use in a telecommunications network, and in such a way that a given network authentication key can be derived onto any target module without a global secret being provisioned onto a multiplicity of modules.

Preferably, at least one of the said derivation algorithms is provided with an input seed value as well as a master key, resulting in an output key value, such that the algorithm is reversible, allowing one or more possible seed values to be pre-computed to result in a target key value.

Conveniently at least one of the said derivation algorithms additionally provides integrity-protection to the derived key. It is preferred that integrity protection is additionally provided to algorithm identifiers and algorithm parameters to be used in conjunction with the derived key.

The security module may be arranged to ensure that the derived key value can only be modified using the key derivation algorithm and associated data structures. In addition, the module may be arranged to ensure that the key value and associated algorithm identifiers and parameters cannot be modified independently, but only jointly, using the key derivation algorithm and associated data structures.

Conveniently the module re-checks the integrity of the derived network authentication key, and optionally associated algorithm identifiers and parameters, on defined events or before each usage.

The storage means preferably stores the seed value rather than the resulting key value, and re-derives the key value prior to integrity checking on defined events or before each usage.

It is preferred that the seed value is itself protected during transmission to the security module using an encryption and/or integrity algorithm.

Advantageously the seed value is transmitted to the security module using an over-the-air mechanism.

A plurality of trusted parties may be enabled to manage network authentication keys and associated subscription data within the security module, either sequentially or in parallel.

One or more trusted parties may use keysets which are first generated by an original trusted party, and then optionally changed by the subsequent trusted party. Furthermore, the original trusted party may ensure that only one subsequent trusted party at a time is enabled to manage network authentication keys and associated subscription data within the security module.

The module may be embedded within the device or may alternatively be removable. The module may be an embedded UICC or a removable UICC.

In accordance with further aspects of the invention, there is provided a device containing such a telecommunications security module. The device is preferably suitable for machine-to-machine or other machine-type communications implementations.

BRIEF DESCRIPTION OF THE DRAWINGS

For a better understanding of the present invention, reference will now be made, by way of example only, to the accompanying drawings in which:—

DETAILED DESCRIPTION

Figure 1:
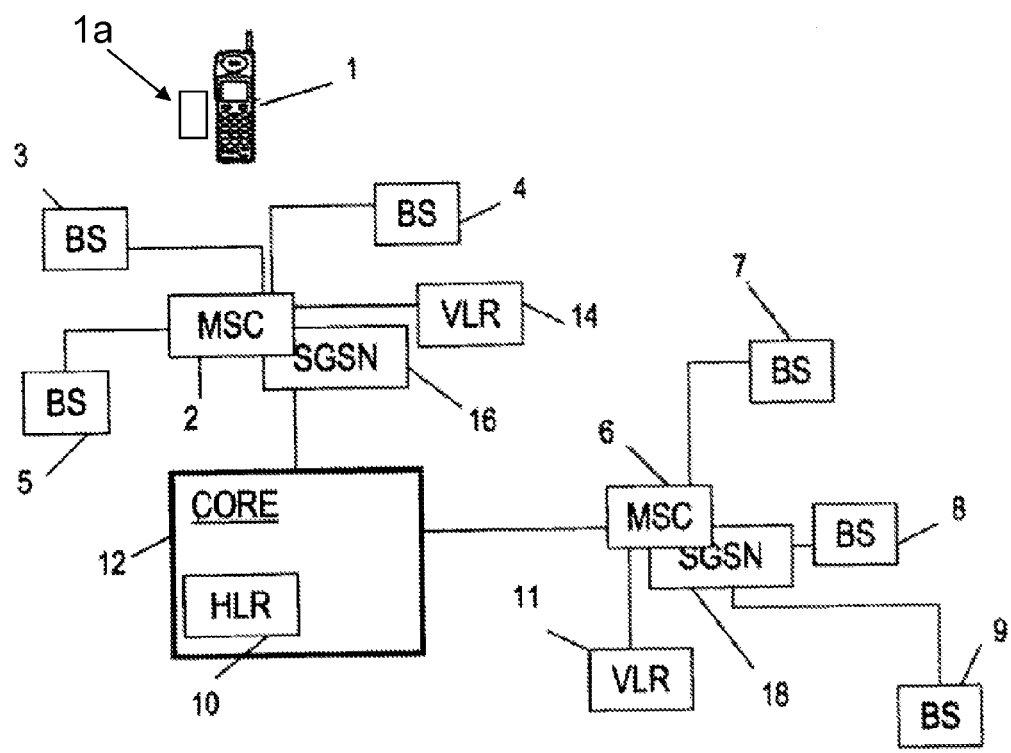
FIG. 1 illustrates key elements of a mobile/cellular telecommunications system and FIG. 2 illustrates a key derivation mechanism in accordance with the invention.
Figure 2:
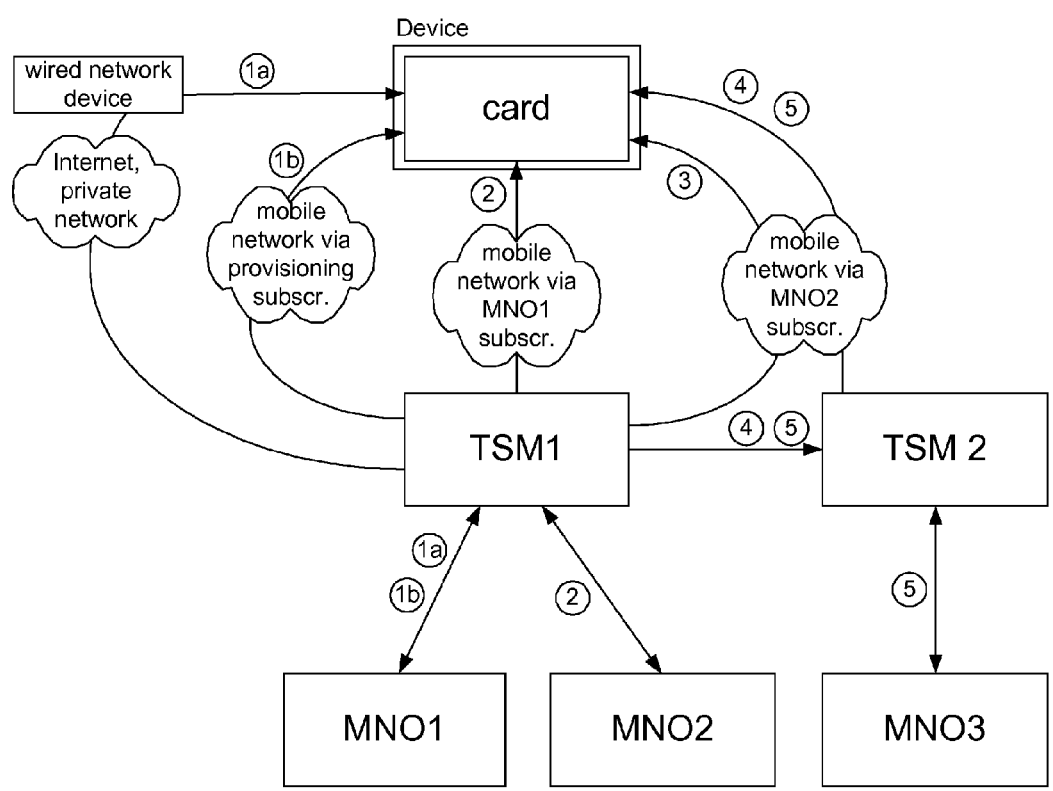

Key elements of a mobile/cellular telecommunications system, and its operation, will now briefly be described with reference to FIG. 1.

Each subscriber to a cellular telecommunications network, such as a GSM or UMTS network, is provided with a UICC/smart card (e.g. SIM, USIM) which, when associated with the user's mobile terminal, identifies the subscriber to the network. The SIM card is pre-programmed with a unique identification number, the "International Mobile Subscriber Identity" (IMSI) which is not visible on the card and is not known to the subscriber, and also a unique key, Ki. The subscriber is issued with a publicly known number, that is, the subscriber's telephone number, by means of which calls to the subscriber are initiated by callers. This number is the MSISDN.

The network includes a home location register (HLR)/home subscriber server (HSS) 10 which, for each subscriber to the network, stores the IMSI and the corresponding MSISDN together with other subscriber data, such as the current or last known MSC of the subscriber's mobile terminal. The HSS is the master database for the network, and while logically it is viewed as one entity, in practice it will be made up of several physical databases. The HSS holds variables and identities for the support, establishment and maintenance of calls and sessions made by subscribers.

When the subscriber wishes to activate their mobile terminal in a network (so that it may make or receive calls subsequently), the subscriber places their SIM card in a card reader associated with the mobile terminal (terminal 1 in this example). The mobile terminal 1 uses the radio access network to transmit the IMSI (read from the smart card) to the core network of the cellular network operated by the MNO where the IMSI etc are stored.

The HLR 10 causes an authentication procedure to be performed on the mobile terminal 1. The HLR 10 transmits an authentication request comprising the subscriber identity (IMSI) to an AUC (authentication centre) for deriving authentication vectors (AVs). Based on the IMSI, the AUC generates a challenge, which is a random number, or obtains a stored challenge based on the IMSI. Also, the AUC generates an XRES (expected result), based on the challenge and a secret shared with the SIM, or obtains an XRES stored with the challenge. The XRES is used to finalise the authentication.

The authentication data and XRES, are then transmitted in an authentication challenge to the mobile telephone 1. The mobile telephone 1 generates a response by transmitting the authentication data to the SIM of the mobile telephone 1. The SIM generates, based on the Ki of the subscription stored on the SIM and the authentication challenge, a response corresponding to the XRES stored in the server.

For finalising the authentication according to SIM authentication the core network compares the response value with the value of the stored XRES for authentication control.

If the response from the mobile terminal 1 is as expected, the mobile terminal 1 is deemed authenticated.

As part of the authentication process a cipher key Kc for encrypting user and signalling data on the radio path is also established. This procedure is called cipher key setting. The key is computed by the mobile terminal 1 using a one way function under control of the key Ki and is pre-computed for the network by the AuC. Thus at the end of a successful authentication exchange both parties possess a fresh cipher key Kc.

The authentication process will conventionally be repeated while the mobile terminal 1 remains activated and can also be repeated each time the mobile terminal makes or receives a call, if required. Each time the authentication process is performed a new Kc is generated and provided to the terminal 1.

The above mechanism does not permit straightforward replacement of one Ki by another (for another MNO) and therefore suffers from the disadvantages outlined above.

The scheme in accordance with the invention, combines key derivation and OTA provisioning. At production, a master secret, K_master, is provisioned on the card. When provisioning a new subscription, a "Trusted Services Manager" (TSM) generates a random or pseudo-random seed (SEED), and transfers it to the card. The SEED is used by the card in the key derivation process.

As the SEED is generated only when needed, the TSM has no knowledge of any Ki that is generated in the future. Also, if the TSM deletes the Ki after sending it to the MNO and to the card, then he keeps no long term knowledge of the K.

While Ki itself is not sent in a secured packet as would be done in an OTA Ki provisioning scheme, this scheme has the same advantages. The derivation value (SEED) being delivered as a secured OTA packet.

Preferably the key derivation is a reversible process (e.g. encrypting the SEED with key K_master), so that it works even if a Ki is provided by MNOs, or if a Ki has been provided to an MNO at an earlier stage and is already loaded in an HLR. The SEED generated by the TSM is thus not a random value: the TSM calculates the value to be sent to the card from the MNO provided Ki by applying the reverse key derivation operation.

A key derivation method is used on the card (UICC) to derive a Ki from a pre-loaded master key "K_master", by sending a data string SEED, such that Ki=KDF(K_master, SEED). However, the derivation function is reversible, such that it is possible to derive any desired target Ki by pre-computing an appropriate SEED. This means any desired target Ki (already ordered and existing in an operator's HLR) can be derived onto any card.

This solution allows a SIM card (UICC) to be remotely personalized for any operator with any target subscription key (Ki), but without sending an operator "Ki" Over The Air, without storing a Ki in a writable file, and without a huge collection of pre-loaded keys.

In a preferred embodiment, the derivation uses an authenticated encryption algorithm, so that the card can check the integrity of the resulting Ki. For example, we might actually have KDF(K_master, SEED)=Ki∥Hash(Ki) or KDF(K_master, SEED)=Ki∥MAC(Ki) and the card checks the corresponding hash or message authentication code (MAC) function matches the derived hash or MAC, thus ensuring that the Ki is exactly as intended.

Conveniently, any parameters for use of the Ki (e.g. an algorithm identifier, operator rotations and constants for MILENAGE) are also integrity-protected along with the Ki itself, so that the Ki cannot be used with an incorrect algorithm (something which would also jeopardize Ki security).

The "SEED" is itself sent to the card protected using an OTA encryption+OTA integrity algorithm, so that the key derivation mechanism is in addition to OTA security, not a replacement for OTA security.

As an additional protection measure, the "SEED" is stored persistently on the card; the Ki is not. Instead, the Ki is re-derived on each start-up, or each usage, of the SIM/USIM authentication algorithm, and the integrity of the Ki is re-checked (so that any attempts at tampering/partial update of the Ki are easily detectable).

In a further aspect of the invention, there is advantageously a choice from a (limited) number of pre-loaded "master keys" and associated derivation algorithms, so that different operator Groups are not required to trust each other's keys and algorithms. In addition, there is a choice from a range of trusted parties (basically Trusted Service Managers, TSMs), each of which is able to send a "SEED" to the card OTA.

It is a security requirement that Ki cannot be updated on the UICC in any way except by use of a pre-defined data structure sent OTA along with the SEED; nor can its parameters (OPc, alg_id, r, c) be updated independently of K.

Derivation of Ki

In a preferred embodiment, the mechanism for deriving Ki from SEED should meet the following requirements:

The key derivation is reversible, so that any target Ki can be derived from the pre-loaded master key K_master, by sending a suitably tailored SEED The derivation algorithm provides an integrity check (e.g. via a form of authenticated encryption), so that the card can check the integrity of the resulting Ki The parameters for use of the Ki (e.g. algorithm id and rotation and constant parameters) are also integrity-protected along with the Ki itself.

Consider, for example, the string (Ki∥CheckSum)) calculated by encrypting SEED with the master key K_master, using AES as cipher:

$$Ki\|CheckSum = E[SEED]_{Kmaster}$$

and the card verifies that CheckSum=SHA-256 (Ki∥algorithm_parameters). This scheme allows the TSM to calculate SEED if Ki is given (either if it is provided by the MNO, or already stored in the MNO's HLR, or if a subscription is to be provisioned a second time with the same Ki):

$$SEED = D[Ki\|CheckSum]_{Kmaster}$$

An advantage of such a scheme is that it helps the card meet the above security requirement that Ki and associated algorithm parameters cannot be updated except through the defined data structure. The card does not store Ki in a file, but just stores SEED, and re-computes Ki when needed (e.g. at card start-up, or on each use of the authentication-algorithm). Even if SEED is tampered with, e.g. partially overwritten, in an attempt to discover the Ki value, then the tampering will be detected and the card can refuse to execute the authentication algorithm. The integrity mechanism also ensures that Ki cannot be used with the wrong authentication algorithm, or with incorrect OPc, rotations, constants etc.

Advantageously, two derivation algorithms are incorporated: a main and a back-up. Different master keys will need to be used with different algorithms, so an algorithm identifier (or more explicitly a K_master identifier) is also required when sending SEED. In principle, MNO groups could also specify (proprietary) key derivation algorithms, to be used with specific master keys.

In one embodiment of the invention, the card (e.g. SIM) is associated with (typically embedded within) a machine to machine (M2M) terminal. The term "M2M" has been used to describe applications in such diverse fields as: tracking and tracing; payment; remote maintenance; automotive and electronic toll (e.g. telematics); metering; and consumer devices. The augmentation of M2M to allow wireless communications between devices (often referred to as mobile M2M) makes new services possible in some cases (within the automotive industry, for instance) and in others extends existing M2M services (within the field of smart metering).

With mobile M2M, machines numbering in the order of millions and located anywhere within mobile network coverage, can be simultaneously monitored to provide real-time information that an individual or enterprise can analyze and act upon.

Whether those M2M terminals are mobile or fixed, there are many scenarios where the possibility of secure, authenticated wireless communication with each terminal is seen as beneficial. It certainly allows the M2M devices to become widely distributed without significantly increasing the burden of monitoring the output from the devices.

Clearly physically exchanging smart cards in devices that are widely distributed may present a logistical headache. And would be impractical where M2M devices have embedded SIM cards.

In the case of M2Mapplications, the supplier of M2M services, while a distinct entity from the host MNO, may be a trusted party and may wish to effect subscription management (i.e. become a TSM).

In some cases, it may be pragmatic to allow more than one TSM to perform subscription management. This will allow there to be a choice from a range of trusted parties (TSMs) each of which can send appropriate SEED values to the card OTA.

Consider the change of TSM from TSM1 to TSM2:
TSM1 provides TSM2 with the data required to perform subscription management (Issuer Security Domain (ISD) or other Trusted Security Domain (TSD), card-ID, keyset, etc.).
TSM2 should then change the key values within the keyset so that only TSM2 is able to manage the subscriptions on the card using that keyset.
The change of TSM may also be associated with a change of MNO: consider for instance a change of subscription (from MNO2 to MNO3) whilst also changing TSM (from TSM1 to TSM2). This change should not be allowed by the incumbent TSM if the card is "locked" to the incumbent MNO (e.g. under contractual terms).

If there are several sequential changes of TSM, there is a risk that key compromise by any TSM in the chain affects the security of all subsequent TSMs' keys, even if the keys are changed by the subsequent TSMs. Hence such compromise also impacts the security of all subsequent MNOs' keys. Advantageously, an approach should be adopted that reduces such a "chain risk", as follows:

TSM1 has keyset 1. To hand-over to TSM2, TSM1 checks that the card is not locked to the current active MNO. If there is no lock, TSM1 creates a new temporary keyset 2, and hands keyset 2 to TSM2. TSM2 replaces temporary keyset 2 by a persistent keyset.

TSM1 promises not to use keyset 1 while TSM2 is the subscription manager; TSM2 promises not to delete keyset 1.

To hand-over to TSM3, TSM1 checks that the card is not locked to the current active MNO. If there is no lock, TSM1 overwrites keyset 2 with a new temporary keyset 2, and hands keyset 2 to TSM3. TSM3 replaces temporary keyset 2 by a persistent keyset.

TSM1 promises not to use keyset 1 while TSM3 is the subscription manager; TSM3 promises not to delete keyset 1

. . . and so on for future changes of TSM. This solution allows an unlimited number of changes of TSM, but is technically simple as there are never more than two keysets usable for subscription management. The promise of TSM1 ensures that only one keyset is used at a time. A compromise of keys by TSM2 does not affect the security of TSM3's, TSM4's keys etc. and no TSM has to hand over their own keys. No changes are needed in GlobalPlatform. Accredited TSMs would only be obliged to create keysets for other accredited TSMs, so that the promises made between TSMs are reliable.

If key derivation from a master key K_master is used, in accordance with the invention, then each TSM will need to know a corresponding K_master. Potentially, each TSM could pass the value of K_master to its successor, but this re-creates the risk of sequential compromise described above. Pre-loading K_masters and assigning them to known (accredited) TSMs in an ecosystem, with some reserved for future accredited TSMs is another possible solution. The benefit is that key distribution issues are more manageable since they apply to a few accredited TSMs rather than many MNOs.

The hand-over mechanism described above requires the current TSM (TSM1) to create a keyset in the Issuer Security Domain for a competitor TSM (TSM2). That new keyset may be unknown to TSM1, or known only temporarily, depending on whether there is an asymmetric or symmetric solution.

Either way these solutions require the current TSM1 to release valuable resources to its competitor: in many circumstances, this may not be commercially acceptable. While TSM1 and TSM2 might agree a price for this facility, that price would be likely to impact the commercial case for releasing the resource.

Consequently, a further improvement of the above mechanism is provided. As the immediate concern is provision of the hand-over mechanism to an MNO that has ordered SIMs (or more exactly Ks, IMSIs, ICCIDs etc.) in advance from TSM2 but has not ordered them from TSM1. Furthermore, this MNO may have a trust relationship with TSM2, but not one with TSM1: and as a result the MNO would typically wish to deny TSM1 access to its keys.

This further improvement operates as follows:
1. TSM1 creates a "minimal" SbsD (Subscription Domain) which will eventually be owned by the target MNO, but is temporarily owned by TSM2. This means creating a minimal file system, RFMs etc. TSM1 ensures that a keyset for this minimal SbsD is passed to TSM2. The keyset may be set up using PUT KEY, or using Confidential Card Content Management (in which case TSM1 won't know the keyset). Alternatively, a number of minimal SbsDs may be pre-loaded with the pre-loaded keys passed directly from the eUICC supplier to TSM2.

2. Without yet activating the SbsD, TSM2 uses its keyset to provision the SbsD with a full set of profile data on behalf of the target MNO (IMSI, K, USIM application, other applications etc), including using any preferred key derivation method for K that is supported on the card.
3. TSM2 informs TSM1 that it has finished provisioning the new SbsD, and asks SM1 to activate it.
4. TSM1 activates the new SbsD.
5. TSM2 changes the keyset for the SbsD and passes them to the target MNO, so they become the MNO's OTA keys. (Alternatively, if the OTA keys have been pre-ordered, TSM2 just changes them to the pre-ordered values).

The crucial difference is in step 2. In the above flow, it must be possible to manage an "inactive" SbSD using the keyset of that SbsD itself: in effect, providing an invisible background update. As defined above, only the keyset of the ISD is able to perform such background updates. Provided TSM2 is trustworthy, this is unlikely to present a security problem: i.e. TSM2 can be trusted not to use up all the spare memory when building the background SbsD or to interrupt essential foreground processes etc).

Advantageously, the above flow minimises the number of parties that need to control the process: since only one party (TSM1) ever needs to be in charge of the ISD, yet it can be arranged that they never know the keyset for the SbsD.

A further advantage is that if an MNO does ever want to become its own TSM, that possibility is cleanly supported by the above model. Essentially the MNO just takes on the role of TSM2, and takes over the provisioning process at step 2 on its own behalf.

The invention claimed is:

1. A method for managing subscription information stored on a microprocessor card, the card being pre-provisioned with an associated unique card number, at least one predefined unique master key (K_master) and at least one number generating means, the method comprising:
    receiving at the microprocessor card a derivation value (SEED) from one of a plurality of trusted parties (TSM), said derivation value (SEED) associated with an identification number (Ki);
    storing the derivation value (SEED) on the microprocessor card; and
    generating at the microprocessor card the identification number (Ki) using the number generating means, the derivation value (SEED) and the at least one predefined unique master key (K_master);
    wherein the identification number (Ki) is configured for authorizing a subscription to a telecommunications network and is provided for provisioning the card with said subscription,
    wherein the microprocessor card is pre-provisioned with a plurality of predefined unique master keys (K_master),
    wherein the microprocessor card is further pre-provisioned with root key identifiers corresponding to the respective predefined unique master keys (K_master) and at least two number generating means, thereby providing at least a main number generating means and a back-up number generating means, each number generating means identifying a different one of the predefined unique master keys by said master key identifiers.

2. A method as claimed in claim 1, further comprising:
    providing an integrity check whereby the card checks the integrity of the generated identification number (Ki).

3. A method as claimed in claim 1, wherein the identification number (Ki) is deleted after use in authentication with an MNO.

4. A method as claimed in claim 1, wherein the derivation value (SEED) is received in a secured OTA packet.

5. A method as claimed in claim 1, wherein the key derivation is a reversible process, so that by applying a reverse key derivation at a trusted party (TSM) using the unique card number, the SEED and master key K_master, the SEED can be correlated with any desired Ki.

6. A method as claimed in claim 1, wherein the identification number Ki is re-derived on each start-up of the microprocessor card authentication algorithm.

7. A method according to claim 1, wherein the generating the identification number (Ki) is performed only when the identification number (Ki) is needed.

8. A method according to claim 1, wherein the identification number (Ki) is a replacement of an identification number (Ki) previously associated with the card.

9. A method according to claim 1, wherein the identification number (Ki) is used to personalize the card to an operator.

10. A method according to claim 1, wherein the generating the identification number (Ki) is further performed by using the unique card number and a root key.

11. A method according to claim 1, wherein the microprocessor for generating the identification number (Ki) is further configured to use the unique card number and a root key.

12. A telecommunications security module, provisioned with one or more unique master keys, and one or more number generating means, the module comprising:
    means for receiving a derivation value (SEED) from one of a plurality of trusted parties (TSM), said derivation value (SEED) associated with an identification number (Ki);
    storage means for storing the derivation value (SEED);
    a microprocessor for generating the identification number (Ki) using the number generating means, the derivation value (SEED) and the one or more unique master keys;
    wherein the identification number (Ki) generated is configured for authorizing a subscription to a telecommunications network and is provided for provisioning the card with said subscription,
    wherein the telecommunications security module is pre-provisioned with a plurality of predefined unique master keys (K_master),
    wherein the telecommunications security module is further pre-provisioned with root key identifiers corresponding to the respective predefined unique master keys (K_master) and at least two number generating means, thereby providing at least a main number generating means and a back-up number generating means, each number generating means identifying a different one of the predefined unique master keys by said master key identifiers.

13. An apparatus incorporating a telecommunications security module as claimed in claim 12.

14. A method for managing subscription information stored on a microprocessor card, the card being pre-provisioned with an associated unique card number, at least one predefined unique master key (K_master) and at least one number generating means, the method comprising:
    receiving at the microprocessor card a derivation value (SEED) from one of a plurality of trusted parties (TSM), said derivation value (SEED) associated with an identification number (Ki);
    storing the derivation value (SEED) on the microprocessor card; and
    generating at the microprocessor card the identification number (Ki) using the number generating means, the derivation value (SEED) and the at least one predefined unique master key (K_master);
    wherein the identification number (Ki) is configured for authorizing a subscription to a telecommunications network and is provided for provisioning the card with said subscription, wherein the identification number (Ki) is not persistently stored on the microprocessor card such that the identification number (Ki) is re-derived on each usage of the microprocessor card.

15. A method as claimed in claim 14, further comprising: providing an integrity check whereby the card checks the integrity of the generated identification number (Ki).

16. A method as claimed in claim 14, wherein the identification number (Ki) is deleted after use in authentication with an MNO.

17. A method as claimed in claim 14, wherein the derivation value (SEED) is received in a secured OTA packet.

18. A method as claimed in claim 14, wherein the key derivation is a reversible process, so that by applying a reverse key derivation at a trusted party (TSM) using the unique card number, the SEED and master key K_master, the SEED can be correlated with any desired Ki.

19. A method as claimed in claim 14, wherein the microprocessor card is pre-provisioned with a plurality of predefined unique master keys (K_master).

20. A method as claimed in claim 19, wherein the microprocessor card is further pre-provisioned with root key identifiers corresponding to the respective predefined unique master keys (K_master) and at least two number generating means, thereby providing at least a main number generating means and a back-up number generating means, each number generating means identifying a different one of the predefined unique master keys by said master key identifiers.

* * * * *